Oct. 27, 1959     C. E. HOEKSTRA     2,910,263

SHOCK AND VIBRATION ISOLATION MOUNT

Filed May 2, 1955

INVENTOR.
CYRUS E. HOEKSTRA,

BY Lockwood, Galt, Woodard + Smith
ATTORNEYS.

2,910,263
SHOCK AND VIBRATION ISOLATION MOUNT

Cyrus E. Hoekstra, Fort Wayne, Ind., assignor to The Magnavox Company, Fort Wayne, Ind., a corporation Application May 2, 1955, Serial No. 505,477

3 Claims. (Cl. 248—358)

This invention relates generally to mounts for isolation of shock and vibration, and more particularly to a mount especially adapted to support electronic apparatus relatively free of shock and vibration.

When electronic apparatus is mounted in aircraft or land vehicles, a certain amount of noise may be introduced into the output of such electronic apparatus as a result of vibration inherent in the operation of the aircraft or land vehicle. Therefore, it is desirable to provide mountings for electronic tubes and related components of electronic circuits which do not resonate within the frequency range of the signals being transmitted or otherwise conducted within the electronic apparatus. It has been found to be particularly difficult to prevent noise signals in certain types of aircraft, wherein the frame of the aircraft inherently vibrates to a substantial degree.

Accordingly, the principal object of this invention is to provide a novel shock and vibration isolation mounting for electron tubes or related electronic apparatus.

Another object of this invention is to provide a shock and vibration isolation mount for electronic apparatus having a low degree of resonance at relatively low vibration frequencies.

Still another object of this invention is to provide a mounting device for electronic apparatus having a relatively rigid platform and flexible leg members of such structure that shock and vibrational movement of the leg members creates frictional forces sufficient to prevent the platform from vibrating with any sharp degree of resonance and of such character that the frictional forces themselves will not vibrate the platform.

In accordance with this invention there is provided a shock mount for electronic apparatus comprising strands of braided wire tubing connected between the electronic apparatus and supporting chassis structure.

The full nature of the invention will be understood from the accompanying drawings and the following description and claims:

Figure 1:
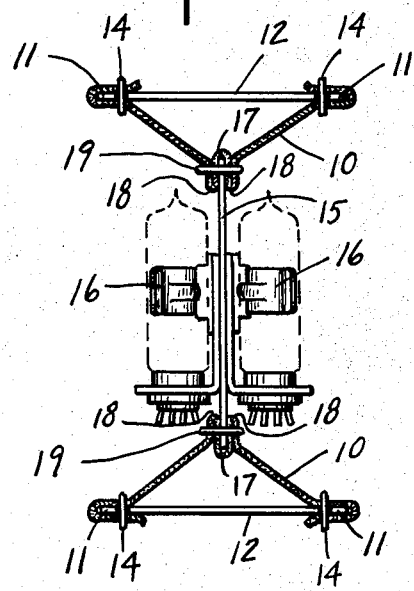
Fig. 1 is a side elevation view of the shock mount provided by this invention as it would be adapted for supporting electronic tubes.
Figure 2:
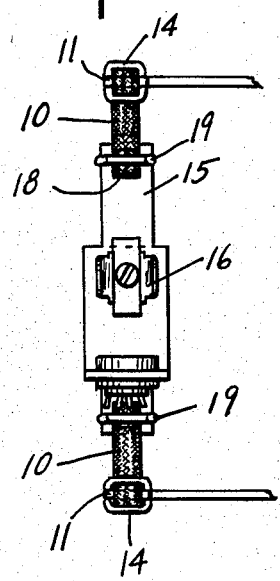
Fig. 2 is an end elevation of the apparatus shown in Fig. 1.

Referring to the drawings, this invention provides a shock and vibration isolation mount consisting of a strand 10 of braided wire tubing which has been flattened to form a ribbon of braided wire. The outer ends of ribbon 10 may be folded over the side edges 11, for example, of a portion 12 of a conventional chassis utilized for supporting electronic apparatus. The folded ends of ribbon 10 may be clamped to the chassis member 12 by means of a wire clamping member 14. If so desired, solder may be applied to ribbon 11 and wire 14 to fix these members to the chassis portion 12.

A length of strap metal 15 may support a pair of tube mounting clips 16 and the strap 15 may be supported at each end thereof by the ribbon 10. In order to obtain secure fastening of the ribbon to the strap, the ribbon 10 may be folded over the end of the strap at 17 and then folded back on itself as at 18 so that a wire clamp 19 may be wrapped around the folded ribbon and the end portion of strap 15 to clamp the ribbon into place. Solder may be applied to obtain a rigid fastening between ribbon 10, strap 15 and wire clamp 19. In order to further enhance the clamping action of the wire 19, the strap 15 and also the chassis portion 12 may be notched slightly (not shown) to receive and position the wire 19 and also the wire 14.

While the drawing illustrates the ribbon 10 as extending in a straight line from the chassis to the strap 15, it will be understood that there should be no tension in ribbon 10 but that it should provide a relatively loose and flexible support.

Figure 3:
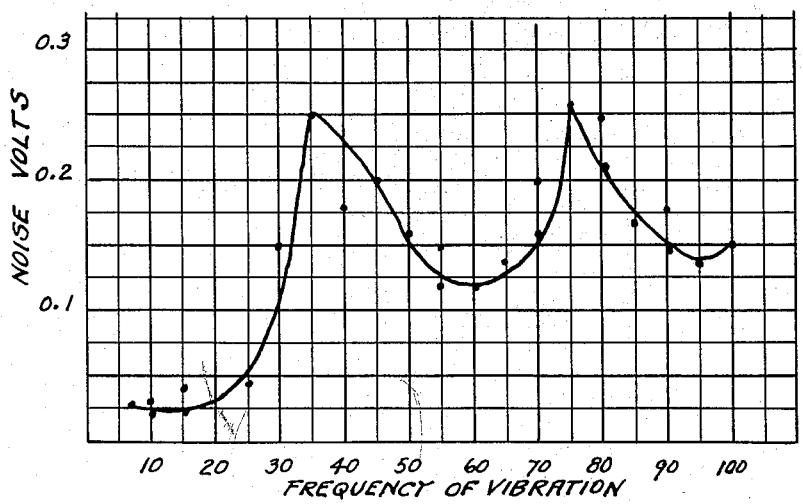
Fig. 3 is a graph showing the vibration response characteristics of a typical embodiment of this invention.

Figure 3 is a graph showing the vibration response characteristics of a typical embodiment of this invention when employed for the support of the first two stages (combined voltage gain, 30 db) of a 70 db voltage gain audio amplifier with a 150 ohm resistive load. The vibration test was performed, with an amplifier chassis excursion of 0.080 inch, double amplitude between the vibration frequencies of 5–15 cycles per second; with an excursion of 0.036 inch, double amplitude, between the frequencies of 15–55 cycles per second; and with the double amplitude adjusted to provide ±5 g. acceleration between the vibration frequencies of 55–100 cycles per second. This provides a concrete example of the noise in tenths of volts, peak to peak, produced in a high gain (70 db) audio amplifier with a 150 ohm resistive load when the chassis member 12 is vibrated at the frequencies shown with acceleration equivalent to those encountered in aircraft and land vehicles.

While the strand 10 of the braided wire tubing has been disclosed as being flattened to form a ribbon, it is intended that strand 10 may be of any configuration which will provide equal resiliency and resistive frictional damping, regardless of the axis of vibration. For example, strand 10 may be formed by inserting a cylindrical rod of proper diameter to expand the braid to its maximum diameter. The rod may then be removed to leave a cylindrical flexible wire mesh. The strand 10 may then be employed in such a manner that it is essentially free of tension or compression as compared with its condition when the rod is removed therefrom.

The shock and vibration isolation mount, as provided in accordance with this invention, creates within itself such frictional forces that the strap 15 can not go into sharp resonance, and the strap 15 will not be vibrated or driven by the frictional forces created within the braided wire tubing. It is the frictional forces of the individual wires of the braid created by rubbing action on one another which prevent any sharp resonance or vibration of strap 15. Also, the crossed wires of the braid do not have enough friction to provide a driving connection to the strap 15.

The invention claimed is:

1. A shock and vibration isolation mounting device including a tube mounting strap, a chassis adapted to support said strap, and a flattened, braided wire, tubular ribbon member folded at its mid portion over one end of said strap, a wire clamp wrapped around the fold in said ribbon generally in a plane normal to the plane of the fold and in clamping relation to said strap, the end portions of said ribbon including folds engaging spaced portions of said chassis, and wire clamps wrapped around said folded end portions generally in a plane normal to the plane of the fold and in clamping relation to said portions of the chassis.

2. A shock and vibration isolation mounting device including a component mounting strap, a chassis adapted to support said strap, and a flattened braided wire tubular ribbon member folded at its mid portion over one end of said strap, a clamp wrapped around the fold in said ribbon generally in a plane normal to the plane of the fold and in clamping relation to said strap, the end portions of said ribbon including folds engaging spaced portions of said chassis, and clamps wrapped around said folded end portions generally in a plane normal to the plane of the fold and in clamping relation to said portions of the chassis.

3. A shock and vibration isolation mounting device including a component mounting strap, a chassis adapted to support said strap from four spaced portions of said chassis, and two braided wire ribbon members each attached at its mid-portion to one of the ends of the strap, a clamp wrapped around each of said ribbons in clamping relation to said strap, the end portions of each of said ribbons engaging spaced, juxtaposed portions of said chassis, and clamps wrapped around each of said end portions of the straps and the corresponding portions of the chassis.

References Cited in the file of this patent

UNITED STATES PATENTS

| | | |
|---|---|---|
| 1,302,482 | Ross | Apr. 29, 1919 |
| 1,956,550 | Dawson | May 1, 1934 |
| 2,755,079 | York | July 17, 1956 |

FOREIGN PATENTS

| | | |
|---|---|---|
| 336,585 | Great Britain | Oct. 13, 1930 |
| 715,796 | Great Britain | Sept. 22, 1954 |